United States Patent [19]
Andreani

[11] Patent Number: 5,876,485
[45] Date of Patent: Mar. 2, 1999

[54] PROCESS AND APPARATUS FOR THE TREATMENT OF A GAS BY ADSORPTION WITH A VARIABLE PRODUCTION FLOW RATE

[75] Inventor: Philippe Andreani, Le Kremlin Bicetre, France

[73] Assignee: L'Air Liquide, Societe Anonyme Pour L'Etude et L'Exploitation des Procedes Georges Claude, Paris Cedex, France

[21] Appl. No.: 903,431

[22] Filed: Jul. 30, 1997

[30] Foreign Application Priority Data

Jul. 30, 1996 [FR] France ................... 96 09 592

[51] Int. Cl.⁶ .................................... B01D 53/053
[52] U.S. Cl. .................... 95/23; 95/101; 95/102; 95/103; 95/105; 95/117; 95/130; 95/109; 95/144
[58] Field of Search .............. 95/22, 23, 96–105, 95/117, 130, 139; 96/109, 113, 143, 144

[56] References Cited

U.S. PATENT DOCUMENTS

| | | | |
|---|---|---|---|
| 3,313,092 | 4/1967 | Potts | 96/113 |
| 3,740,928 | 6/1973 | Schmid | 96/113 |
| 4,140,495 | 2/1979 | Pietruszewski | 96/113 X |
| 4,197,096 | 4/1980 | Sebastian et al. | 96/143 X |
| 4,323,370 | 4/1982 | Leitgeb | 95/23 |
| 4,534,346 | 8/1985 | Schlaechter | 96/144 X |
| 4,561,865 | 12/1985 | McCombs et al. | 55/25 |
| 4,717,396 | 1/1988 | Stengle et al. | 96/113 X |
| 4,892,566 | 1/1990 | Bansal et al. | 96/143 X |
| 5,228,888 | 7/1993 | Gmelin et al. | 95/96 |
| 5,258,056 | 11/1993 | Shirley et al. | 95/22 |
| 5,281,253 | 1/1994 | Thompson | 95/23 X |
| 5,370,728 | 12/1994 | LaSala et al. | 95/101 |
| 5,407,465 | 4/1995 | Schaub et al. | 95/102 X |
| 5,496,388 | 3/1996 | Tellier | 96/113 X |
| 5,620,501 | 4/1997 | Tamhankar et al. | 96/143 X |
| 5,658,371 | 8/1997 | Smolarek et al. | 95/101 |
| 5,679,134 | 10/1997 | Brugerolle et al. | 96/144 X |

FOREIGN PATENT DOCUMENTS

| | | |
|---|---|---|
| 0 689 862 | 1/1996 | European Pat. Off. . |
| 21.38.663 | 1/1973 | France . |
| 2 003 742 | 3/1979 | United Kingdom . |

*Primary Examiner*—Robert Spitzer
*Attorney, Agent, or Firm*—Young & Thompson

[57] ABSTRACT

This process carries out a cycle on a monoadsorber (1) connected, on the one hand, to at least one container (2, 3) via a line (8, 10) fitted with a variable-opening valve (9, 11) and, on the other hand, to a reversible compression/pumping machine coupled to a speed variator (5). Application in particular to the production of oxygen at a variable flow rate from atmospheric air.

11 Claims, 1 Drawing Sheet

PROCESS AND APPARATUS FOR THE TREATMENT OF A GAS BY ADSORPTION WITH A VARIABLE PRODUCTION FLOW RATE

The present invention relates to a process for the treatment of a gas by pressure-swing adsorption between a high cycle pressure above atmospheric pressure and a low cycle pressure below atmospheric pressure. It applies in particular to the production of oxygen from atmospheric air.

The object of the invention is to provide a process and an apparatus enabling a single adsorber, or monoadsorber, to be used in situations in which the production flow rate is highly variable, especially in the case in which it is necessary, during certain time intervals, to switch from running at a nominal rate to running at a reduced rate, with the possibility of keeping the extreme pressures of the cycle constant.

For this purpose, the subject of the invention is a process for the treatment of a gas by pressure-swing adsorption between a high cycle pressure above atmospheric pressure and a low cycle pressure below atmospheric pressure, characterized in that:

a single adsorber coupled to at least one container and to a reversible compression/pumping machine is used;

a cycle, comprising a production phase, a regeneration phase comprising a purge step by countercurrent pumping down to the low pressure of the cycle, and a recompression phase comprising a final, cocurrent recompression step, is carried out in the adsorber; and when the production flow rate is reduced (or alternatively increased) from a first value DN to a very different second value D, the speed of rotation of the machine is reduced (or alternatively increased) during the production phase, the purge step and the final recompression step, the cross-sectional flow area for the gas product leaving the adsorber is reduced (or alternatively increased) during the production phase, and the durations of the production phase, of the purge step and of the final recompression step are increased (or alternatively reduced).

The subject of the invention is also an apparatus enabling a process as defined above to be carried out. According to one aspect of the invention, this apparatus comprises:

an adsorber connected at one end, called the outlet, to at least one first container via a first line fitted with a variable-opening valve;

a reversible compression/pumping machine connected to the other end, called the inlet, of the adsorber; and a speed variator coupled to the reversible machine.

An embodiment of the invention will now be described by way of non-limiting illustration with reference to the appended drawing, in which.

Figure 1:
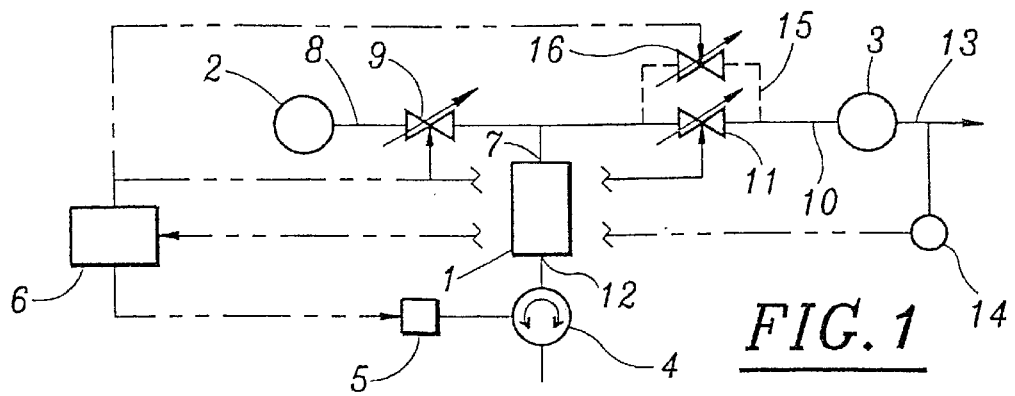
FIG. 1 shows diagrammatically an oxygen production apparatus according to the invention.

The plant shown in FIG. 1 is intended to produce oxygen-enriched air, or impure oxygen (called "oxygen" for the sake of simplicity), with a purity typically of between approximately 90 and 95%, from atmospheric air.

In the embodiment shown, the plant essentially comprises a single adsorber 1, two containers 2 and 3, a reversible multi-lobed compression/pumping machine 4, advantageously of the Roots type, a speed variator 5 coupled to the machine 4, and an electronic control unit 6. The outlet 7 of the adsorber 1, i.e. its end via which the gas product leaves, is connected to the container 2 via a line 8 fitted with a variable-opening valve 9. The outlet 7 is also connected to the container 3 via another line 10 equipped with a variable-opening valve 11.

Of the two inlet/delivery ports of the machine 4, one port is directly connected to the inlet 12 of the adsorber, which is the opposite end of the latter from the outlet 7, and the other port is directly connected to atmosphere. The expression "directly" here means that no valve is provided in the corresponding path.

A production line 13 departs from the container 3 and a flow meter 14 measures the flow rate of the gas product conveyed by this line 13. The flow meter 14 sends the control unit 6 a signal representative of the measured flow rate and the unit 6 sends the speed variator 5 and the valves 9 and 11 signals which, on the basis of this information, regulate the speed of rotation of the machine 4 as well as the extent to which the valves 9 and 11 are opened, in a manner which will be described in more detail hereinbelow.

Figure 2:
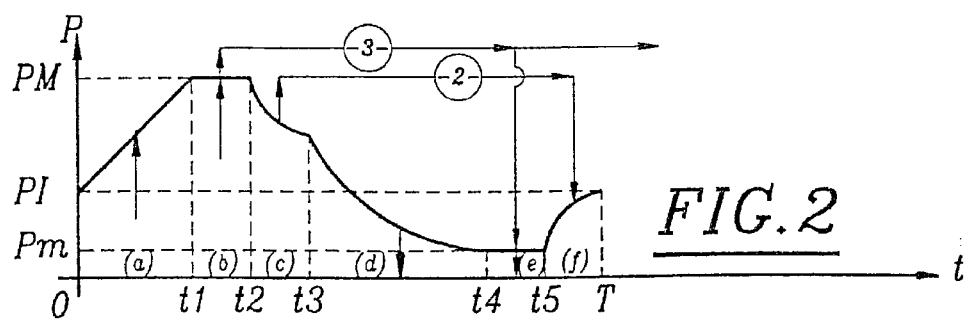
FIG. 2 is a diagram which illustrates an example of a cycle carried out by the apparatus in FIG. 1, running at a nominal rate.

By means of the apparatus thus described, a cycle such as that shown, by way of illustration, in FIG. 2, is carried out in the adsorber 1 in order to produce oxygen at a nominal flow rate DN. A cycle time T of from 1 minute to a few minutes may be chosen. In the example in question, T=90 s. In FIG. 2, in which the times $t$ are plotted as the abscissae and the absolute pressures P as ordinates, the arrow-headed lines indicate the movements and destinations of the gas flows from and to the adsorber.

Figure 3:
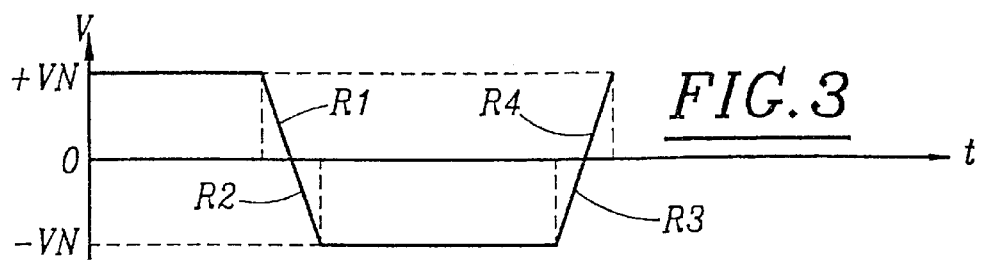
FIG. 3 is a diagram corresponding to FIG. 2 and illustrating the speed of the reversible rotating machine.

An example of a complete cycle will now be described with reference to FIGS. 1 to 3. The cycle varies between two extreme pressures, namely a high or maximum pressure PM, roughly of between atmospheric pressure and $2 \times 10^5$ Pa and more particularly roughly of between 1 and $1.6 \times 10^5$ Pa, and a low or minimum pressure Pm, roughly of between 0.2 and $6.5 \times 10^5$ Pa.

The cycle comprises the following successive steps:

(a) from t=0 to t1 (=20 s), a final cocurrent recompression step by means of atmospheric air to be treated. During this step, the machine 4 operates as a compressor at its nominal speed VN (FIG. 3), the valves 9 and 11 are closed, and the pressure increases from an intermediate pressure PI up to close to the high pressure PM;

(b) from t1 to t2 (=30 s), a more or less isobaric production step performed at the high cycle pressure PM. During this step, the machine 4 still operates as a compressor at the speed VN, the valve 11 is open, and gas product (impure oxygen) is drawn off via the outlet 7 of the adsorber and sent to the container 3;

(c) from t2 to t3 (=40 s), a first, cocurrent decompression step down to an intermediate high pressure, above PI. During this step, the valve 11 is closed and the valve 9 is open, so that gas having virtually the composition of the gas product is sent from the outlet 7 of the adsorber into the container 2.

During this step, the machine 4 is made to reverse its direction of rotation by following a deceleration gradient R1 and then an acceleration gradient, in the opposite direction, R2 (FIG. 3), which two gradients may or may not have the same slope. At time t3, the speed of rotation of the machine 4 is −VN;

(d) from t3 to t4 (=70 s), a purge step by countercurrent pumping down to the low pressure Pm. During this step, gas rich in highly adsorbable constituents (nitrogen and impurities) is extracted as a countercurrent from the inlet 12 of the adsorber and discharged into the surrounding atmosphere. Also during this step, the machine 4 operates as a vacuum pump at the speed −VN, and the valves 9 and 11 are closed;

(e) from t4 to t5 (=80 s), a step of countercurrent elution/pumping more or less isobarically at the low pressure Pm by gas product. During this step, the valve 11 is open to a different extent than during the production step (b), and gas product from the container 3 is sent as a countercurrent into the adsorber, with simultaneous countercurrent pumping by the machine 4 rotating at the speed −VN;

(f) from t5 to T, a first, countercurrent recompression step up to the intermediate pressure PI by gas coming from the balancing container 2. During this step, the valve 11 is closed and the valve 9 is open to an extent which is generally different from that during the first, cocurrent decompression step (c). As a result, gas from the container 2 enters, as a countercurrent, via the outlet 7 of the adsorber. Also during this step, the machine 4 is again made to reverse its direction of rotation, the following a deceleration gradient R3 and then an acceleration gradient R4 in the opposite direction (FIG. 3), which two gradients may or may not have the same slope. At the time T, the speed of rotation of the machine 4 is +VN.

Step (b) constitutes the production phase of the adsorber; steps (c), (d) and (e) constitute the regeneration phase of the adsorber; steps (f) and (a) constitute the recompression phase of the adsorber.

When the demand for oxygen product in the line 13 decreases substantially, dropping from the nominal flow rate DN to a reduced flow rate D=α.DN (α<1), this variation is detected by the flow meter 14 and the control unit 6 receives the corresponding information.

Figure 4:
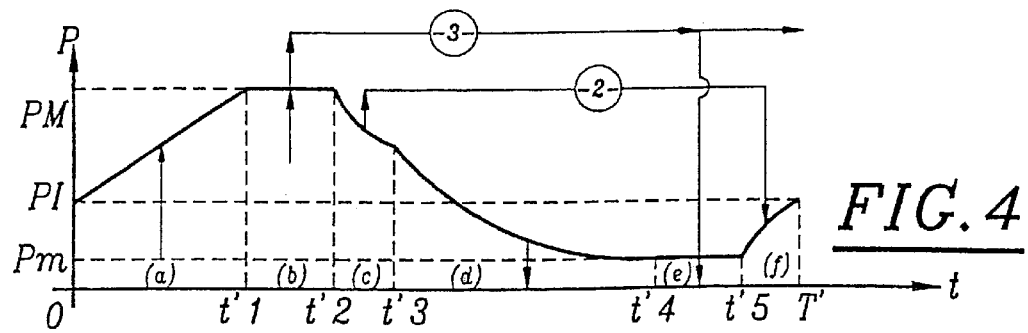
FIGS. 4 and 5 are diagrams corresponding respectively to FIGS. 2 and 3, but relating to the apparatus running at a reduced rate.
Figure 5:
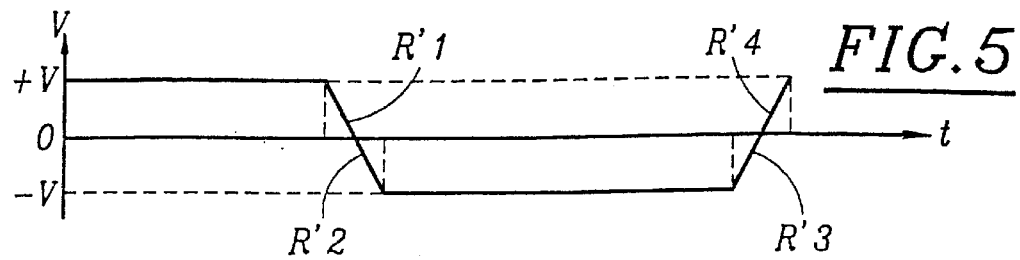

This control unit 6 then acts simultaneously on the speed variator 5 and on the valves 9 and 11 (extent of opening and times off switching between the open and closed positions) in order to modify the cycle in the manner illustrated in FIGS. 4 and 5.

On the one hand, the speed of rotation of the machine 4, during the final recompression step (a), the production step (b), the purge step (d) and the elution step (e), is reduced by a factor R which will be defined below.

The speed of rotation therefore switches from +R.VN in respect of steps (a) and (b) to −R.VN in respect of steps (d) and (e).

On the other hand, the durations of steps (a), (b), (d) and (e) are extended by multiplying them by 1/R. In contrast, the durations of the first, cocurrent decompression step (c) and of the first, countercurrent recompression step (f) are unchanged in relation to running at the nominal rate.

Consequently, during steps (c) and (f), the machine 4 must switch, during the same time interval as previously, from a speed of rotation of +R.VN to a speed of rotation of −R.VN, or vice versa. Consequently, the variator 5 causes deceleration and acceleration of the machine by following the accordingly modified gradients R'1, R'2, R'3 and R'4 (FIG. 5).

Finally, in order to maintain the pressures PM and Pm when running at the reduced rate, the extents to which the valves 9 and 11 are open are correspondingly reduced during steps (b) and (e).

This gives the cycle illustrated in FIG. 4, which comprises the same steps (a) to (f) as that in FIG. 2, but with the following relationships:

period of the cycle: T'=T/α durations of steps (a), (b), (d) and (e): t'1, t'2−t'1, t'4−t'3, t'5−t'4, these being equal to the corresponding durations for running at the nominal rate, multiplied by the same factor 1/R.

More specifically, if the demand for gas product becomes αDN, in the example in question, in which t3−t2 (=c)=T−t5 (=f)=10 s:

$R=(T-20)/(((T/\alpha)-20)$.

As a variant, as indicated by the broken lines in FIG. 1, a bypass 15, fitted with an additional variable-opening valve 16 controlled by the unit 6, may be provided across the terminals of the valve 11, in which case one of the two valves 11 and 16 is open during the production phase (b) and the other during the elution step (e). In the absence of such a bypass 15, the extent to which the valve 11 is open is different during the production step (b) and elution step (e). Also as a variant, the elution (phase e) may be carried out with gas coming from the container 3, at least part of the recompression (phase f) being effected by gas from the container 2.

It should be noted that the nominal speed of rotation of the machine 4 may be different depending on its direction of rotation, in which case the formulae indicated above are applied to the two values in question in order to calculate the speeds of rotation for running at a reduced rate.

I claim:

1. Process for the treatment of a gas by pressure-swing adsorption between a high cycle pressure (PM) above atmospheric pressure and a low cycle pressure (Pm) below atmospheric pressure, in which:

an adsorber (1) coupled to at least one container (2, 3) and to a reversible compression/pumping machine (4) is used;

a cycle, comprising a production phase (b), a regeneration phase comprising a purge step (d) by countercurrent pumping down to the low pressure of the cycle, and a recompression phase comprising a final, cocurrent recompression step (a), is carried out in the adsorber; and when the production flow rate is reduced (or alternatively increased) from a first value DN to a very different second value D, the speed of rotation of the machine (4) is reduced (or alternatively increased) during the production phase (b), the purge step (d) and the final recompression step (a), the cross-sectional flow area for the gas product leaving the adsorber (1) is reduced (or alternatively increased) during the production phase (b), and the durations of the production phase (b), of the purge step (d) and of the final recompression step (a) are increased (or alternatively reduced).

2. Process according to claim 1, characterized in that:

the regeneration phase comprises a final step (e) of countercurrent elution/pumping at least partly at the low pressure (Pm) of the cycle, during which gas stored in a first container (3) is sent as a countercurrent into the adsorber (1) and, simultaneously, gas is pumped as a countercurrent from this adsorber; and when the production flow rate is reduced (or alternatively increased) from said first value DN to said second value D, during said step (e), the speed of rotation of the machine (4), as well as the cross-sectional flow area for gas between the adsorber (1) and the first container (3), is reduced (or alternatively increased) and the duration of the elution/pumping step (e) is increased (or alternatively reduced).

3. Process according to claim 1, characterized in that:

the regeneration phase comprises a first, cocurrent decompression step (c), during which gas flows from the adsorber into a second container (2), and the recompression phase comprises a step (f) of first, countercurrent recompression by means of gas coming from this container; and when the production flow rate is reduced (or alternatively increased) from said first value DN to said second value D, the durations of the first, cocurrent decompression step (c) and of the first, countercurrent recompression step (f) are maintained more or less constant.

4. Process according to claim 3, characterized in that:

the direction of rotation of the reversible machine (4) is reversed during the first, cocurrent decompression step (c) and the first, countercurrent recompression step (f); and when the production flow rate is reduced (or alternatively increased) from said first value DN to said second value D, the slopes of the deceleration and acceleration gradients (R1 to R4) of the reversible machine are changed during the reversals.

5. Process according to claim 3, characterised in that, when the production flow rate is reduced (or alternatively increased) from said first value DN to said second value D, the cross-sectional flow area for gas between the adsorber (1) and the second container (2) is maintained more or less constant during the first, cocurrent decompression step (c) and the first, countercurrent recompression step (f).

6. Apparatus for the treatment of a gas by pressure-swing adsorption between a high cycle pressure (PM) above atmospheric pressure and a low cycle pressure (Pm) below atmospheric pressure, comprising:

an adsorber (1) connected at one end (7), called the outlet, to at least one first container (2; 3) via a first line (8; 10) fitted with a variable-opening valve (9; 11);

a reversible compression/pumping machine (4) connected to the other end (12), called the inlet, of the adsorber; and a speed variator (5) coupled to the reversible machine.

7. Apparatus according to claim 6, characterized in that the adsorber (1) has its outlet (7) also connected to a second container (3) via a second line (10; 8) fitted with a variable-opening valve (11, 9).

8. Apparatus according to claim 6, characterized in that said line (10) has, across the terminals of its variable-opening valve (11), a bypass (15) fitted with another valve.

9. Apparatus according to claim 8, wherein said another valve is a variable-opening valve (16).

10. Apparatus according to claim 6, characterized in that it comprises a unit (6) for controlling in a coordinated manner the variable-opening valve (11), and the speed variator (5).

11. Apparatus according to claim 10, characterized in that the unit (6) comprises means for regulating the slopes (R1 to R4) of the deceleration and acceleration gradients of the reversible machine (4) as a function of the speed of rotation imposed by the speed variator (5).

* * * * *